United States Patent [19]

Kremer et al.

[11] Patent Number: 5,067,520

[45] Date of Patent: Nov. 26, 1991

[54] TAP FOR COMPRESSED OR LIQUEFIED GAS

[75] Inventors: Paul Kremer, Walferdange; Leon Kerger, Helmdange, both of Luxembourg

[73] Assignee: Ceodeux S.A., Lintgen, Luxembourg

[21] Appl. No.: 648,580

[22] Filed: Jan. 31, 1991

[30] Foreign Application Priority Data

Jan. 31, 1990 [LU] Luxembourg ............................ 87671

[51] Int. Cl.$^5$ ............................................. F16K 11/18
[52] U.S. Cl. ..................... 137/614.2; 137/614.17; 251/82; 251/89.5
[58] Field of Search ................ 137/614.2, 614.17, 522, 137/523; 251/82, 89.5, 83, 318

[56] References Cited

U.S. PATENT DOCUMENTS

| | | | |
|---|---|---|---|
| 2,500,156 | 3/1950 | Dechant | 137/614.2 |
| 3,485,371 | 12/1969 | Costantini | 137/614.2 |
| 3,589,397 | 6/1971 | Wagner | 137/614.2 |
| 3,981,328 | 9/1976 | Yonezawa | 137/614.2 |
| 4,210,168 | 7/1980 | Yonezawa | 137/614.2 |

Primary Examiner—A. Michael Chambers
Attorney, Agent, or Firm—Leydig, Voit & Mayer

[57] ABSTRACT

The tap comprises a closure member (22) in a chamber (20) at the intersection of an axial inlet channel (14) and a radial outlet channel (16), and a valve intended to contain a specific residual pressure in the bottle through the action of a spring (44). This valve consists of an annular cylindrical piston (38) fitted in a leaktight manner in the said chamber (20) downstream of the closure member (22) and defining, around an axial operating rod (28), an annular cylindrical passage space (46) in communication, in the open position, with the outlet channel (16) via at least one radial orifice (48) in the said piston (38). A leaktight seal (50) is provided between the base of the said piston (38) and the head of the closure member (22), whereas the piston is stressed by a spring (44) in the direction of the closure member (22) and comprises means for locking it in a position distant from the said closure member (22) against the action of its spring (44).

5 Claims, 2 Drawing Sheets ized in that the valve consists of an annular cylindrical piston
TAP FOR COMPRESSED OR LIQUEFIED GAS The present invention relates to a tap for compressed or liquefied gas, comprising a body designed in order to be screwed onto a gas bottle and including a closure member in a chamber at the intersection of an axial inlet channel and of a radial outlet channel, an external operating wheel connected via an axial rod through the body of the tap to a closure member in order to displace the latter between an open position and a closure position, as well as a valve intended to contain a specific residual pressure in the bottle through the action of a spring.

In order to prevent the penetration of impurities into the empty bottles, which could be difficult to remove by rinsing prior to refilling the bottle, the bottles are not completely emptied so as to maintain therein a residual pressure which prevents the penetration of such impurities. To this end, a valve is provided in the body of the tap, which valve closes automatically through the action of its spring when the pressure of the gases in the bottle drops below a predetermined value. However, such a valve prevents the rinsing or filling of the bottle, since these operations are performed via the tap which is open counter to the normal circulation of the gas and the gas which has to penetrate into the bottle stresses the valve in the closure direction thereof. In order to remedy this, various fairly complicated systems have been provided which make it possible to lock the valve in an open position, for example a valve having differential action, in which the pressure of the gases at the entry is transmitted to the opposite side and, by virtue of the various active surfaces, the valve is displaced by the pressure of the gas stressing it.

The invention aims to provide a tap with a residual pressure valve which is characterised by its simplicity, its reliabilty and its cost price, and which does not adversely affect either the rinsing or the filling of a bottle on which the tap is fitted.

In order to achieve this objective, the tap proposed by the present invention is essentially character mounted in a leaktight manner in the said chamber downstream of the closure member and defining, around the axial rod, and annular cylindrical passage space in communication, in an open position, with the outlet channel via at least one radial orifice in the said piston, in that a leaktight seal is provided between the base of the said piston and the head of the closure member, in that the said piston is stressed by a spring in the direction of the closure member, and in that it comprises means for locking it in a position distant from the said closure member against the action of its spring.

The means for locking the piston in a position distant from the closure member may consist of a peripheral shoulder of the piston above the radial orifice and capable of being wedged by a connection tube engaged in the radial outlet channel.

The leaktight seal preferably consists of an O-ring seal provided on the closure member around its axial operating rod, whilst the base of the piston is designed as a seat in order to interact with the said seal.

The extreme open position and that of the operating wheel is determined by a retractable stop which can consist of a screw engaged through the skirt of the operating wheel.

Other special features and characteristics will emerge from the description of an advantageous embodiment, given below by way of illustration with reference to the appended figures, in which.

Figure 1:
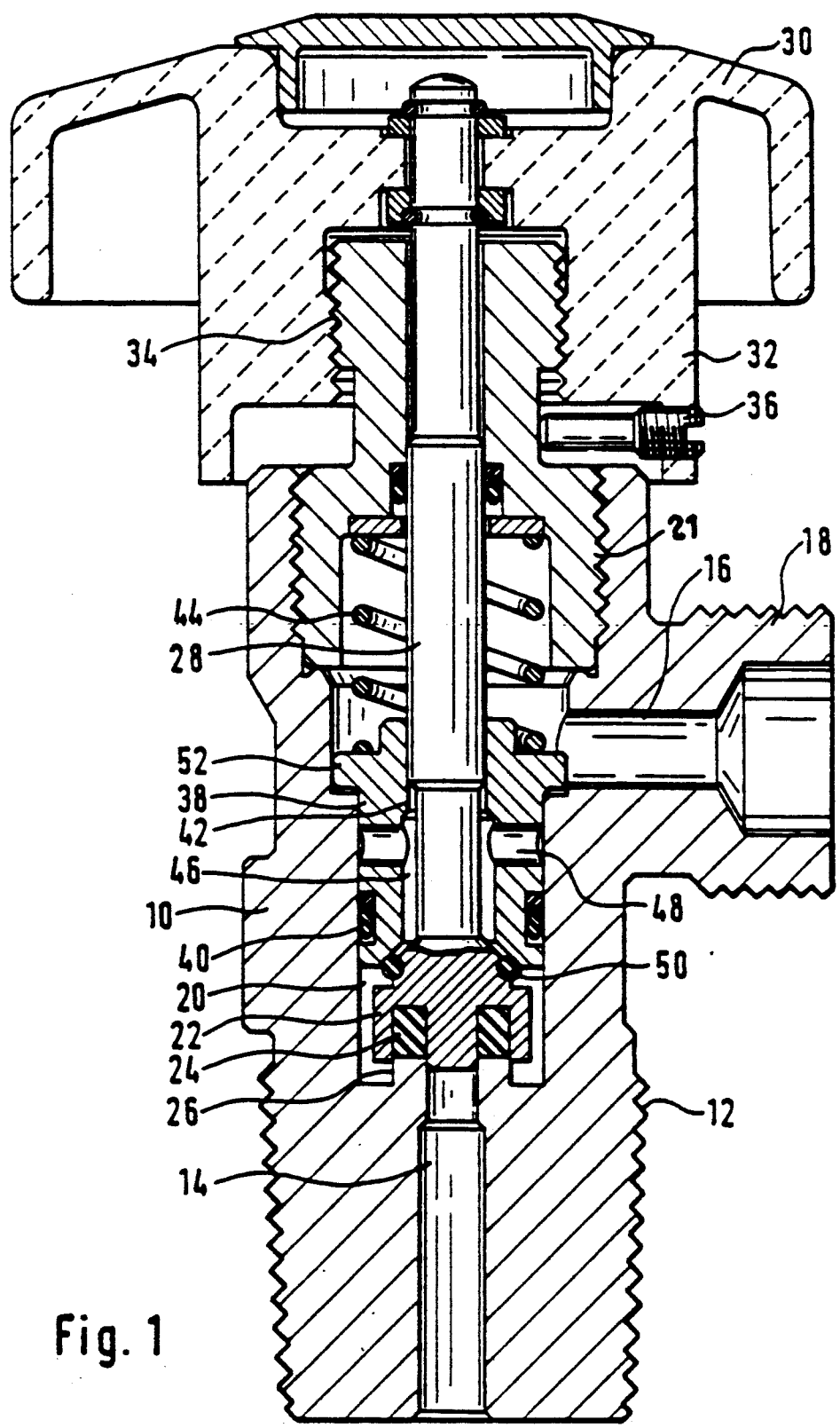
FIG. 1 shows a vertical section of a tap in the closed position.

The tap shown in the figures comprises a body 10, for example made from brass, whose lower portion is provided with a thread which enables it to be screwed onto a gas bottle or other container. In the example shown, the body 10 comprises an axial inlet channel 14 and a radial outlet channel 16 via a connection 18 connected to a use circuit.

At the intersection of the channels 14 and 16 is a substantially cylindrical chamber 20 which is closed towards the top via a plug 21 screwed into the body 10 of the tap. In this chamber 20 is a closure member 22 equipped with a leaktight seal 24 which can interact with a seat 26 around the inlet channel 14 with a view to the closure or the opening of the latter towards the chamber 20. The closure member 22 is integral with an operating rod 28 passing axially through the chamber 20 and the plug 21. This rod 28 is connected, on the outside, to an operating wheel 30 whose skirt 32 is screwed on the head 34 of the plug 21 which emerges from the body 10. A rotation of the wheel 30 relative to the body 10 consequently causes the rise or the fall of the rod 28 and, consequently, the opening or the closure of the channel 14 according to the direction of rotation of the wheel 30.

The extreme open position of the wheel 30 is determined with the aid of a retractable stop, in this case a screw 36 engaged through the skirt 32 of the wheel 30 and which, when the latter is opened, abuts against the mushroom-shaped head 34 and thus prevents further turning of the wheel in the opening direction.

In the chamber 20 is a residual pressure valve which has the form of a piston 38 fitted in a leaktight manner by means of a leaktight seal 40 in the chamber 20 upstream of the closure member 22. This piston 38 comprises a central bore 42 in order to permit the passage of the operating rod 28. The piston 38 is stressed downwards in the direction of the closure member 22 by means of a spring 44 which bears, on the one hand, on the head of the piston 38, and on the other hand, in the bottom of the plug 21.

An annular cylindrical passage space 46 is defined around the lower portion of the rod 28 between the latter and the piston 38, either by means of a narrowing of the rod 28, or by a widening of the bore 42, or, as shown in the figures, by both of these methods. One or more radial orifices 48 also pass through the piston 38 at the level of the passage space 46.

The base of the piston 38 and the head of the closure member 22 are designed in such a manner as to interact with one another in order to form a leaktight closure. To this end, one of these two elements, for example the closure member 22, is, as shown in the figures, provided with an O-ring seal 50, for example made from soft rubber, whereas the base of the piston 38 forms the seat which can be applied in a leaktight manner against the seal 50. As shown in the figures, the base of the piston 38 and the head of the closure member 22 can have complementary frustoconical shapes.

Starting from the level of the radial outlet channel 16, the chamber 20 becomes wider, whereas the piston 38 has a peripheral shoulder 52 corresponding to this widening of the chamber 20.

Figure 2:
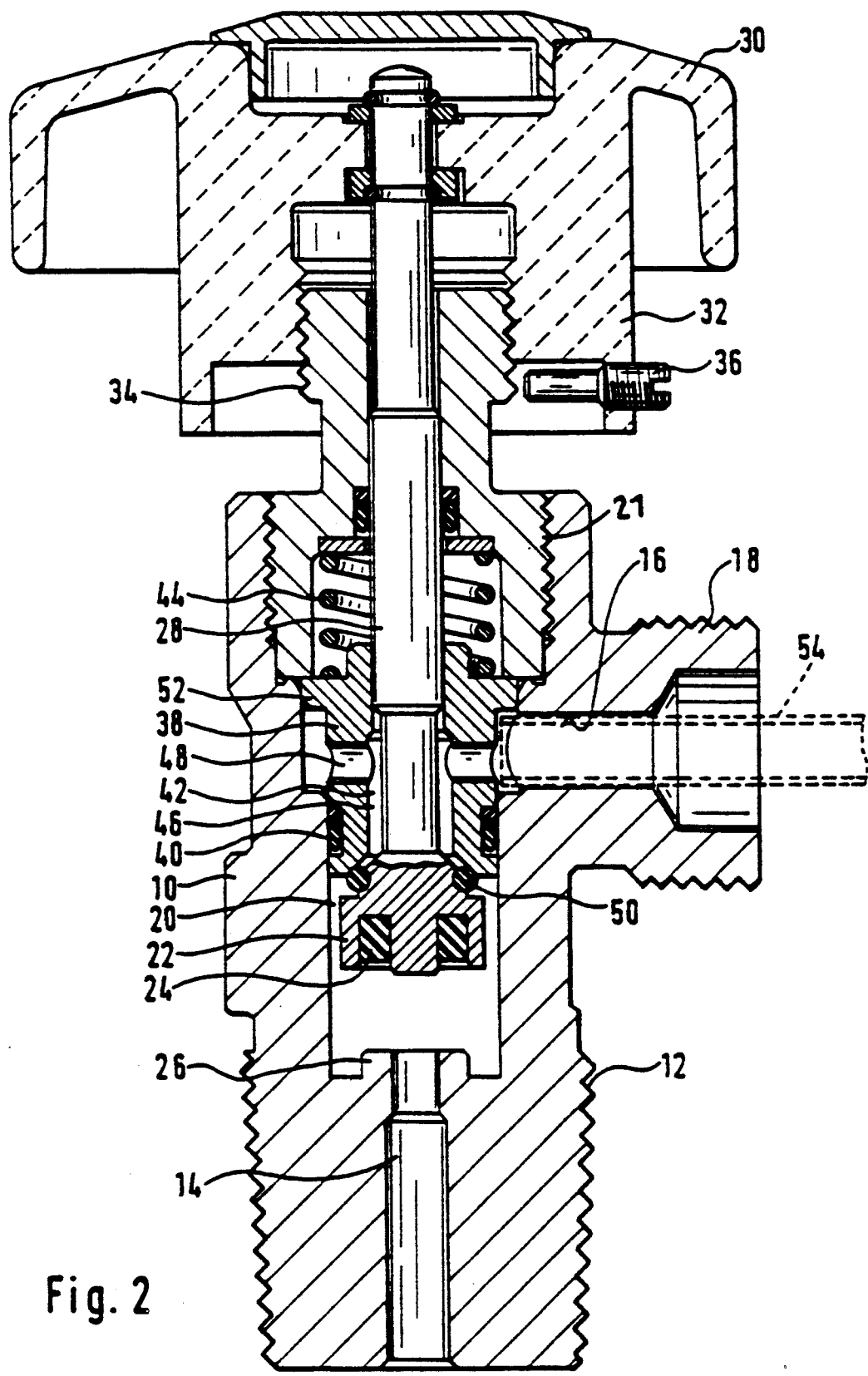
FIG. 2 shows a similar view of the tap in the open position with the valve locked for the filling of the bottle.

A description will now be given of the operation of the tap illustrated herein above with reference to FIGS. 1 and 2. In the position of FIG. 1, the wheel 30 is completely tightened and the tap is closed. In order to open it, it suffices to release the wheel 30 until the stop 36 is halted by the lower edge of the head 34 of the plug 21. Releasing the wheel 30 raises the closure member 22 from its seats 26 so that the gas can escape from the bottle and penetrate into the chamber 20 via the channel 14. The pressure of the gas is usually sufficient to raise the piston 38 from its seal 50 against the action of its spring 44. This rise of the piston 52 brings the radial orifices 48 thereof into communication with the outlet channel 16, thus establishing a free circulation of the gas via the opening between the piston 38 and the closure member 22, the space 46 around the rod 28, the orifice or orifices 48 and, finally, the outlet channel 16 of a use circuit.

If the pressure in the gas bottle drops below a specific threshold, this pressure will be insufficient to raise the pistons 38 against the action of the spring 44 and the latter will push the piston 38 back onto the seal 50 in order to close the passage to the gas at this point. It will thus no longer be possible to empty the bottle when pressure drops to this residual pressure.

However, according to the present invention, it is possible to neutralise the action of the residual presesure valve in order to make it possible to empty the bottle completely if necessary, for example in order to rinse or fill it via the orifice 16. To this end, as illustrated in FIG. 2, the screw 36 is unscrewed in order to enable the wheel 30 to be released beyond the lower edge of the head 34 of the plug 21 as far as the position illustrated in FIG. 2. This releasing causes the closure member 22 and the piston 38 to rise against the pressure of the spring 44 up to the point at which the shoulder 52 of the piston 38 is halted by the lower edge of the plug 21. In this position, a tube 54 is engaged in the channel 16 until it comes into contact with the piston 38. The wheel 30 is then once again tightened by a few turns in order to cause the closure member 22 to descend. The piston 38, on the other hand, remains locked in the position of FIG. 2, since the shoulder 52 is wedged by the inner end of the tube 54. Consequently, by moving away from the piston 38, the closure member 22 frees the passage at the level of the seal 50 in order to make it possible either to completely empty the gas bottle, or to fill it via the tube 54. After filling the bottle, it suffices to manouevre the tap into the position of FIG. 1 by completely tightening the wheel 30, by tightening the screw 36 and by releasing the tube 54 in order to permit the descent of the residual pressure valve through the action of its spring 44.

I claim:

1. Tap for compressed or liquefied gas, comprising a body (10) designed in order to be screwed onto a gas bottle and including a closure member (22) in a chamber (20) at the intersection of an axial inlet channel (14) and of a radial outlet channel (16), an external operating wheel (30) connected via an axial rod (28) through the body of the tap to the closure member (22) in order to displace the latter between an open position and a closure position, as well as a valve intended to contain a specific residual pressure in the bottle through the action of a spring (44), characterised in that the said valve consists of an annular cylindrical piston (38) mounted in a leaktight manner in the said chamber (20) downstream of the closure member (22) and defining, around the axial rod (28), an annular cylindrical passage space (46) in communication, in an open position, with the outlet channel (16) via at least one radial orifice (48) in the said piston (38), in that a leaktight seal (50) is provided between the base of the said piston (38) and the head of the closure member (22), in that the said piston is stressed by a spring (44) in the direction of the closure member (22), and in that it comprises means for locking it in a position distant from the said closure member (22) against the action of its spring (44).

2. Tap according to claim 1, characterized in that the said means consist of a peripheral shoulder (52) of the piston (38) above the said radial orifice (48) and capable of being wedged by a connection tube (54) engaged through the outlet channel (16).

3. Tap according to claim 1, characterised in that the leaktight seal consists of an O-ring seal provided on the closure member (22) around its axial operating rod (28), and in that base of the piston (38) is designed as a seat in order to interact with the said seal (50).

4. Tap according to claim 1, characterised in that the extreme open position of the operating wheel (30) is determined by a retractable stop (36).

5. Tap according to claim 4, characterised in that the said stop consists of a screw engaged through the skirt (32) of the operating wheel (36).

* * * * *